US012630465B2

(12) United States Patent
Ohara et al.

(10) Patent No.: US 12,630,465 B2
(45) Date of Patent: May 19, 2026

(54) GLASS CERAMIC AND CHEMICALLY STRENGTHENED GLASS

(71) Applicant: AGC Inc., Tokyo (JP)

(72) Inventors: Seiki Ohara, Tokyo (JP); Qing Li, Tokyo (JP); Shusaku Akiba, Tokyo (JP)

(73) Assignee: AGC INC., Tokyo (JP)

( * ) Notice: Subject to any disclaimer, the term of this patent is extended or adjusted under 35 U.S.C. 154(b) by 587 days.

(21) Appl. No.: 17/896,048

(22) Filed: Aug. 25, 2022

(65) Prior Publication Data

US 2022/0411318 A1 Dec. 29, 2022

Related U.S. Application Data

(63) Continuation of application No. 17/521,910, filed on Nov. 9, 2021, now Pat. No. 11,505,491, which is a continuation of application No. PCT/JP2021/014811, filed on Apr. 7, 2021.

(30) Foreign Application Priority Data

Sep. 4, 2020 (JP) ................................. 2020-149138

(51) Int. Cl.
| | |
|---|---|
| *B32B 9/00* | (2006.01) |
| *C03C 3/097* | (2006.01) |
| *C03C 21/00* | (2006.01) |

(52) U.S. Cl.
CPC ............ *C03C 3/097* (2013.01); *C03C 21/002* (2013.01); *Y10T 428/315* (2015.01)

(58) Field of Classification Search
CPC .... C03C 3/097; C03C 21/002; Y10T 428/315

USPC ......................................................... 428/408
See application file for complete search history.

(56) References Cited

U.S. PATENT DOCUMENTS

| | | | |
|---|---|---|---|
| 9,351,807 | B2 | 5/2016 | Hoscheler |
| 2014/0376868 | A1 | 12/2014 | Ritter et al. |
| 2016/0102010 | A1 | 4/2016 | Beall et al. |
| 2019/0062201 | A1 | 2/2019 | Weiss et al. |
| 2019/0152841 | A1 | 5/2019 | Ritter et al. |
| 2019/0161397 | A1 | 5/2019 | Beall et al. |
| 2020/0346969 | A1 | 11/2020 | Li et al. |

(Continued)

FOREIGN PATENT DOCUMENTS

| | | | |
|---|---|---|---|
| JP | 2015-508385 A | 3/2015 |
| JP | 2019-043842 A | 3/2019 |
| WO | WO-2017/026450 A1 | 2/2017 |

(Continued)

OTHER PUBLICATIONS

Wondraczek et al., "Transparent Hafnia-Containing B-Quartz Glass Ceramics: Nucleation and Crystallization Behavior," J. A,. Ceram. Soc., vol. 91, No. 6, 2008, pp. 1945-1951.

*Primary Examiner* — Daniel H Miller
(74) *Attorney, Agent, or Firm* — Foley & Lardner LLP

(57) ABSTRACT

The present invention relates to a glass ceramic including crystals, and including, in mol % in terms of oxides: 65-75% of $SiO_2$; 3-6% of $Al_2O_3$; 15-25% of $Li_2O$; 0.2-4% of $P_2O_5$; 0.5-5% of $ZrO_2$; and 0.01-0.5% of $HfO_2$, in which the crystals include one or more kinds of crystals selected from the group consisting of β-spodumene crystals, petalite crystals, and eucryptite crystals.

13 Claims, 9 Drawing Sheets

(56) References Cited

U.S. PATENT DOCUMENTS

2021/0276915 A1    9/2021  Ritter et al.

FOREIGN PATENT DOCUMENTS

WO    WO-2019/167850  A1    9/2019
WO    WO-2020/100490  A1    5/2020

GLASS CERAMIC AND CHEMICALLY STRENGTHENED GLASS

CROSS-REFERENCE TO RELATED APPLICATIONS

This is a Continuation of U.S. patent application Ser. No. 17/521,910, filed on Nov. 9, 2021, which is a Bypass Continuation of International Patent Application No. PCT/JP2021/014811, filed on Apr. 7, 2021, which claims priority to Japanese Patent Application No. 2020-149138, filed on Sep. 4, 2020. The contents of these applications are hereby incorporated by reference in their entireties.

TECHNICAL FIELD

The present invention relates to glass ceramic and chemically strengthened glass.

BACKGROUND ART

Chemically strengthened glass is used for cover glasses of portable terminals. Chemically strengthened glass is produced by forming a compressive stress layer in a surface of glass by, for example, bringing the glass into contact with molten salt containing alkali meal ions and thereby causing ion exchange between alkali meal ions in the glass and the alkali meal ions in the molten salt.

Glass ceramic is glass including crystals precipitated therein. Glass ceramic is harder and less prone to be scratched than amorphous glass which does not contain crystals. Furthermore, glass ceramic that can be chemically strengthened can be made higher in strength than amorphous glass while preventing crushing. However, in many cases, conventional glass ceramic is insufficient in transparency when compared with amorphous glass.

On the other hand, there may occur a case that the transparency of transparent glass lowers due to what is called "solarization," a phenomenon that the valences of multivariant cations such transition metal ions and rare earth ions are changed by influence of ultraviolet light or the like and the glass is thereby changed in color.

Patent document 1 discloses an example in which glass ceramic is chemically strengthened by subjecting it to ion exchange treatment. Patent document 2 discloses a method for preventing solarization of glass by performing clarification using $SnO_2$ and bubbling using oxidizing gas in manufacturing the glass. Patent document 3 discloses a method for suppressing solarization by making glass include $Fe_2O_3$ and $TiO_2$ or $ZrO_2$ in small amounts.

CITATION LIST

Patent Literature

Patent document 1: WO 2019/167850
Patent document 2: JP-T-2015-508385 (The symbol "JP-T" as used herein means a published Japanese translation of a PCT patent application.)
Patent document 3: WO 2017/026450

SUMMARY OF INVENTION

Technical Problem

When used for a display or the like, chemically strengthened glass is subjected to various kinds of pretreatment, one of which is irradiating it with ultraviolet light on the shorter wavelength side using a low-pressure mercury lamp to remove organic substances on the glass surface and cause surface modification. According to a study made by the present inventors, such irradiation with ultraviolet light may lower the transparency of glass in a particular wavelength range.

An object of the present invention is to provide glass ceramic having high transparency and UV resistance and excellent chemical strengthening properties. Another object of the invention is to provide chemically strengthened glass having high transparency and UV resistance.

Solution to Problem

The present invention relates to a glass ceramic including crystals, and including, in mol % in terms of oxides:
- 65-75% of $SiO_2$;
- 3-6% of $Al_2O_3$;
- 15-25% of $Li_2O$; and
- 0.01-0.5% of $HfO_2$.

It is preferable that the glass ceramic of the present invention include, in mol % in terms of oxides:
- 65-73% of $SiO_2$;
- 3-6% of $Al_2O_3$;
- 17-23% of $Li_2O$; and
- 0.015-0.3% of $HfO_2$.

In the glass ceramic of the present invention, it is preferable that the crystals include one or more kinds of crystals selected from the group consisting of β-spodumene crystals, petalite crystals, and eucryptite crystals.

In the glass ceramic of the present invention, it is preferable that a light transmittance as converted into a value corresponding to a thickness of 0.7 mm be 85% or more in a wavelength range of 380 nm to 780 nm.

In the glass ceramic of the present invention, it is preferable that a Young's modulus be 85 GPa or more.

The present invention relates to a chemically strengthened glass including crystals, and including, in mol % in terms of oxides:
- 65-75% of $SiO_2$;
- 3-6% of $Al_2O_3$;
- 15-25% of $Li_2O$; and
- 0.01-0.5% of $HfO_2$.

It is preferable that the chemically strengthened glass of the present invention include, in mol % in terms of oxides:
- 65-73% of $SiO_2$;
- 3-6% of $Al_2O_3$;
- 17-23% of $Li_2O$; and
- 0.015-0.3% of $HfO_2$.

In the chemically strengthened glass of the present invention, it is preferable that the crystals include one or more kinds of crystals selected from the group consisting of β-spodumene crystals, petalite crystals, and eucryptite crystals.

In the chemically strengthened glass of the present invention, it is preferable that a light transmittance as converted into a value corresponding to a thickness of 0.7 mm be 85% or more in a wavelength range of 380 nm to 780 nm.

In the chemically strengthened glass of the present invention, it is preferable that a surface compressive stress value be 100 MPa or more, a depth of a compressive stress layer be 100 μm or more, and a central tensile stress value be 130 MPa or less.

Advantageous Effects of Invention

The present invention provides glass ceramic having high transparency and UV resistance and excellent chemical strengthening properties. The invention also provides chemically strengthened glass having high transparency and UV resistance.

DESCRIPTION OF EMBODIMENT

Figure 1:
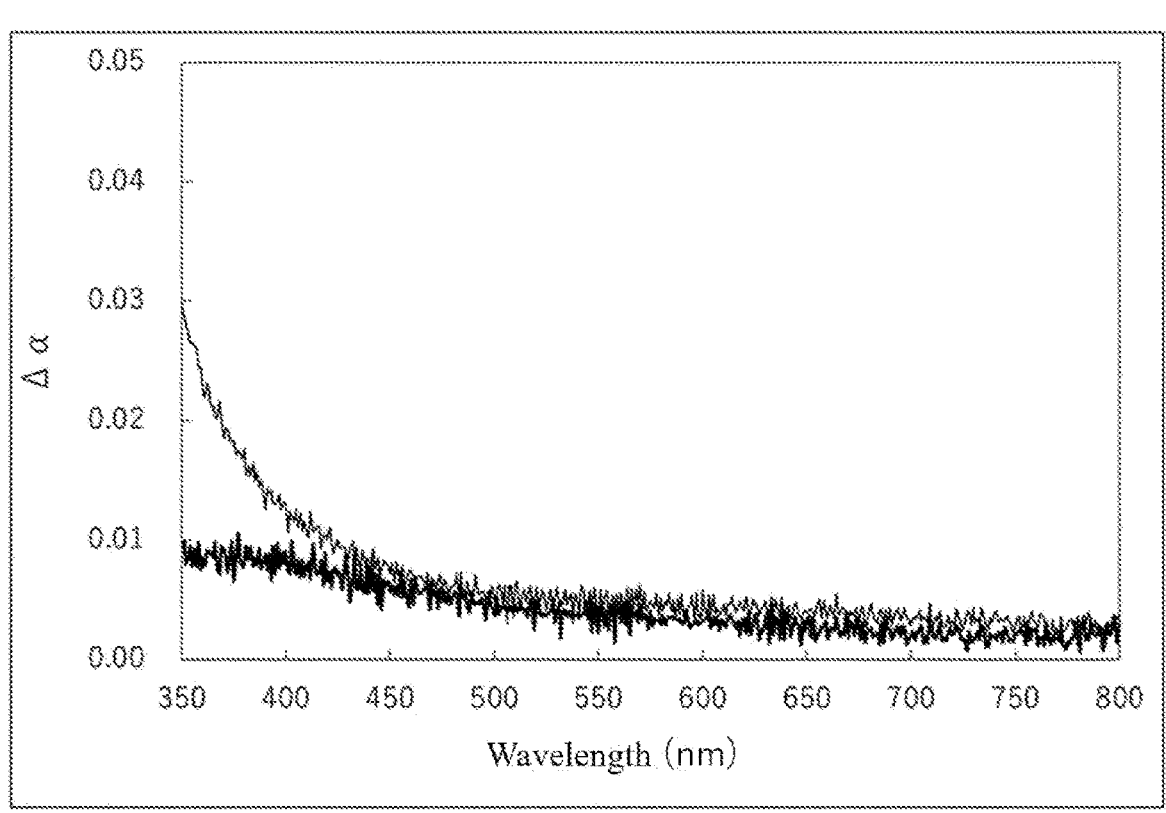
FIG. 1 shows ultraviolet-induced absorption spectra of glass ceramic A and glass ceramic B.

In this specification, the symbol "-" indicating a numerical value range is used in such a sense that the range includes the numerical values written before and after it as the lower limit value and the upper limit value. In this specification, the symbol "-" is used in this sense unless otherwise specified.

In this specification, the term "amorphous glass" means glass in which no diffraction peak indicating a crystal is found by a powder X-ray diffraction method described later. The term "glass ceramic" means glass obtained by subjecting "amorphous glass" to heat treatment to precipitate crystals and hence contains crystals. In this specification, "amorphous glass" and "glass ceramic" may be together referred to as "glass." Amorphous glass to become glass ceramic by being subjected to heat treatment may be referred to as "base glass of glass ceramic."

In this specification, a measurement by the powder X-ray diffraction method is performed by the following method. That is, a measurement is performed using CuK α ray in a 2θ range of 10°-80°. If a diffraction peak indicating a crystal is found, precipitated crystals are identified by a Hanawalt method. A crystal that is identified from peaks including a peak having the highest integration intensity among crystals identified by this method is referred to as a main crystal.

In the following description, the term "chemically strengthened glass" means glass obtained by chemically strengthening treatment and the term "glass for chemical strengthening" means glass before being subjected to chemical strengthening treatment.

In this specification, a variation pattern of the compressive stress value with the depth from the surface of chemically strengthened glass serving as a variable may be referred to as a "stress profile." In this specification, the term "surface compressive stress value (CS)" means a compressive stress value at the outermost surface of chemically strengthened glass. The term "depth of a compressive stress layer (DOC)" means a depth at which the compressive stress value becomes zero. A negative compressive stress value means tensile stress. The term "central tensile stress value (CT)" means a tensile stress value at a depth that is equal to ½ of the sheet thickness t of glass.

In many cases, a stress profile is measured using a light guiding surface stress meter (e.g., "FSM-6000" produced by Orihara Manufacturing Co., Ltd.) as a common procedure. However, because of their principle of measurement, light guiding surface stress meters can measure compressive stress values only in a case that the refractive index decreases from the surface inward. Thus, they cannot measure compressive stress values in a case that lithium aluminosilicate glass has been chemically strengthened using a sodium salt. In view of this, in this specification, a stress profile is measured using a scattered light photoelastic stress meter (e.g., "SLP-2000" produced by Orihara Manufacturing Co., Ltd.). Scattered light photoelastic stress meters can measure compressive stress values irrespective of the refractive index distribution in glass. However, it is difficult for scattered light photoelastic stress meters to measure compressive stress values in the vicinity of the glass surface accurately because they are prone to be affected by surface scattering light. Compressive stress values in a surface layer from the surface to a depth of 10 μm can be estimated through extrapolation on the basis of measurement values in a deeper portion using a complementary error function.

In this specification, a glass composition is represented in mol % in terms of oxides unless otherwise specified and mol % may be written simply as "%."

<UV Resistance>

In this specification, the expression "UV resistance is high" means that a change between transmittance values before and after irradiation with short wavelength ultraviolet light having main wavelengths of 185 nm and 254 nm emitted from a low-pressure mercury lamp is small.

A transmittance reduction that is given by the following equation is referred to as ultraviolet-induced absorption $\Delta\alpha$, where T0 and T1 are transmittance values before and after irradiation with ultraviolet light, respectively. Glass having a large ultraviolet-induced absorption value is glass whose transmittance is prone to be decreased by irradiation with ultraviolet light. Ultraviolet-induced absorption is caused by structural defects etc. of glass.

$$\Delta\alpha = -\ln(T1/T0).$$

To suppress reduction in transmittance, it is preferable that ultraviolet-induced absorption of glass that occurs at a wavelength of 380 nm when it is irradiated with ultraviolet light having wavelengths of 185 nm and 254 nm emitted from a low-pressure mercury lamp for 10 minutes at illuminance of 19 mW/cm$^2$ be 0.015 or less, even preferably 0.012 or less and further preferably 0.010 or less. Although there are no particular limitations on the lower limit of the ultraviolet-induced absorption, the ultraviolet-induced absorption is typically 0 or more.

<Glass Ceramic>

Glass ceramic of an embodiment (also referred to as "present glass ceramic") is characterized in that it contains HfO$_2$ at 0.01%-0.5%. Containing HfO$_2$, the glass ceramic having a chemical composition of the embodiment is high in UV resistance.

To increase the UV resistance, it is preferable that the content of HfO$_2$ be 0.015% or more, even preferably 0.02% or more.

From the viewpoint of suppressing devitrification in a glass forming process, it is preferable that the content of HfO$_2$ be 0.4% or less, even preferably 0.3% or less.

In FIG. 1, a thick-line curve represents an ultraviolet-induced absorption spectrum of glass ceramic that contains $HfO_2$ at 0.2%. A thin-line curve represents an ultraviolet-induced absorption spectrum of glass ceramic having approximately the same chemical composition except that it does not contain $HfO_2$.

It is seen from FIG. 1 that the glass ceramic containing $HfO_2$ is small in ultraviolet-induced absorption to prevent transmittance reduction, and hence is high in UV resistance.

Figure 2:
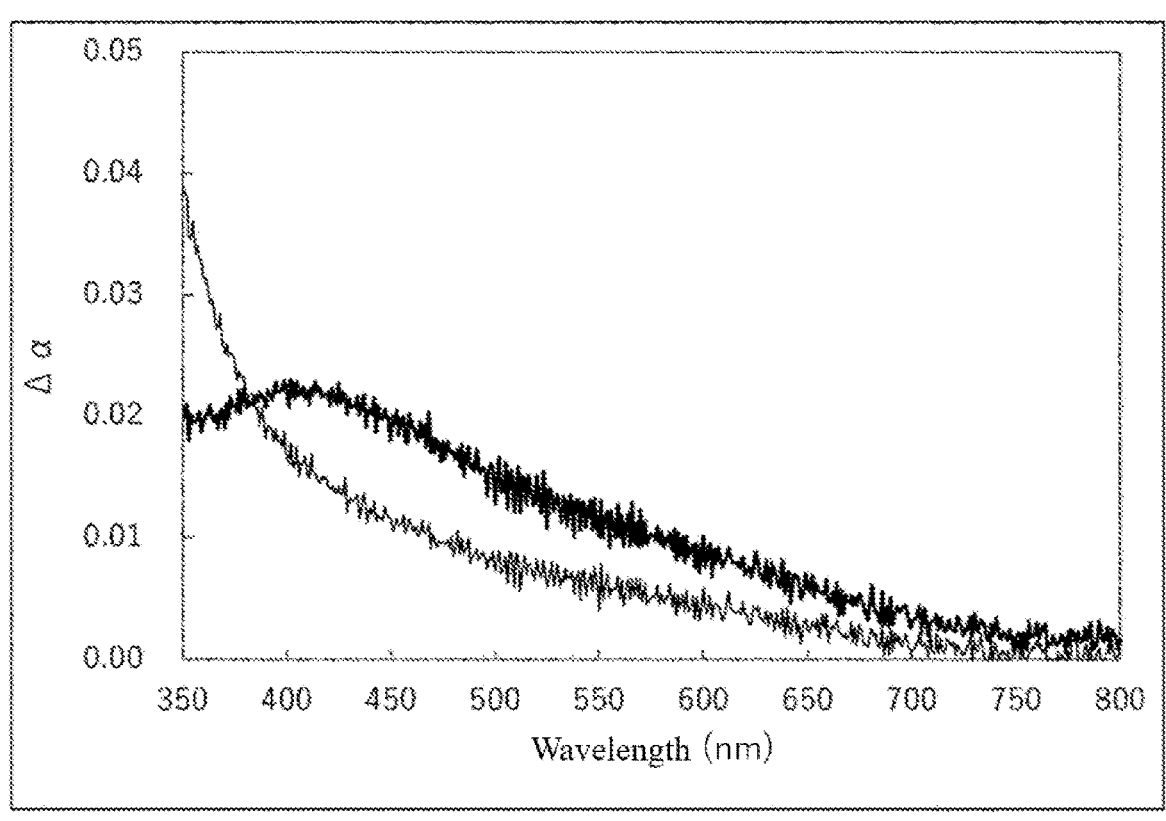
FIG. 2 shows ultraviolet-induced absorption spectra of amorphous glass A and amorphous glass B.

FIG. 2 shows ultraviolet-induced absorption spectra of amorphous glasses that are base glasses of respective glass ceramics in FIG. 1. An ultraviolet-induced absorption spectrum of amorphous glass containing $HfO_2$ is represented by a thick-line curve and an ultraviolet-induced absorption spectrum of amorphous glass not containing $HfO_2$ is represented by a thin-line curve. It is seen from comparison between FIGS. 1 and 2 that the ultraviolet-induced absorption is not suppressed in the amorphous glass containing $HfO_2$.

The present inventors consider that in the glass ceramic having the chemical composition of the embodiment $HfO_2$ is incorporated selectively in glass layers or crystal layers to form local regions where the $HfO_2$ concentration is high. It is considered that from this reason different action occurs in the present glass ceramic than in the amorphous glass when irradiated with ultraviolet light and hence the present glass ceramic exhibit high UV resistance.

It is preferable that the present glass ceramic be lithium aluminosilicate glass containing $SiO_2$ at 65-75%, $Al_2O_3$ at 3-6%, and $Li_2O$ at 15-25%. Having this composition, the present glass ceramic tends to be glass ceramic containing LAS crystals described later.

It is even preferable that the present glass ceramic contain $SiO_2$ at 65-73%, $Al_2O_3$ at 3-6%, and $Li_2O$ at 17-23%.

It is preferable that the present glass ceramic include crystals (hereinafter may be referred to as "LAS crystals") that contain $SiO_2$, $Al_2O_3$, and $Li_2O$. Glass ceramic containing LAS crystals is superior in chemical strengthening properties. It is considered that when the present glass ceramic include LAS crystals, above described local regions where $HfO_2$ concentration is high are formed more easily and hence the present glass ceramic is increased in UV resistance more easily; inclusion of $HfO_2$ is therefore preferable.

It is preferable that the LAS crystals to be included in the present glass ceramic be one or more kinds of crystals selected from the group consisting of β-spodumene crystals, petalite crystals, and eucryptite crystals.

It is preferable that the present glass ceramic include two or more kinds of crystals. This is because when the present glass ceramic include two or more kinds of crystals, the size of each crystal included tends to be small. When crystals included in glass ceramic are small, the transparency tends to be increased. For example, the present glass ceramic may include either two or more kinds of LAS crystals or two or more kinds of crystals that are LAS crystals and crystals other than LAS crystals.

Example crystals other than LAS crystals are lithium metasilicate, lithium disilicate, and lithium phosphate.

Next, the chemical composition of the present glass ceramic will be described. A description relating to $HfO_2$ will be omitted because it has already been made.

$SiO_2$ is indispensable because it is a component for constituting a glass network of the present glass ceramic as well as a component of LAS crystals.

To make it easier to form LAS crystals, the content of $SiO_2$ is 65% or more, preferably 66% or more and even preferably 67% or more. To increase the glass meltability, the content of $SiO_2$ is 75% or less, preferably 73% or less.

$Al_2O_3$ is not only a component of LAS crystals but also a component for increasing the ion exchangeability during chemical strengthening and thereby increasing the surface compressive stress after the strengthening.

To facilitate the chemical strengthening, the content of $Al_2O_3$ is 3% or more, preferably 4% or more. To increase the glass meltability, the content of $Al_2O_3$ is 6% or less, even preferably 5% or less.

$Li_2O$ is not only a component for producing compressive stress in the vicinity of the glass surface through ion exchange but also a component of LAS crystals. To increase the compressive stress, the content of $Li_2O$ is 15% or more, preferably 17% or more and even preferably 20% or more. To attain necessary chemical durability of the glass, the content of $Li_2O$ is 25% or less, preferably 23% or less.

$Na_2O$ is a component for producing compressive stress through ion exchange and a small content of $Na_2O$ may increase the glass stability. The present glass ceramic may contain $Na_2O$ if necessary. In the case where the present glass ceramic contains $Na_2O$, it is preferable that its content be 0.1% or more, even preferably 0.5% or more and further preferably 1.0% or more. To maintain chemical durability, it is preferable that the content of $Na_2O$ be 10% or less, even preferably 8% or less and further preferably 6% or less.

$K_2O$ is an optional component and the present glass ceramic may contain $K_2O$ if necessary. In the case where the present glass ceramic contains $K_2O$, to maintain chemical durability, it is preferable that its content be 3% or less, even preferably 2% or less and further preferably 1% or less.

Whereas each of MgO, CaO, SrO, and BaO is a component for increasing the glass meltability, it tends to lower the ion exchange performance. The present glass ceramic may contain these components if necessary. In the case where the present glass ceramic contains these components, it is preferable that the total content of these components (MgO+CaO+SrO+BaO) be 5% or less, even preferably 3% or less and further preferably 1% or less.

$P_2O_5$ is a component for accelerating crystallization. The present glass ceramic may contain $P_2O_5$ if necessary and it is preferable that $P_2O_5$ is contained in an amount of 0.2% or more. To facilitate crystallization, it is even preferable that the content of $P_2O_5$ be 0.4% or more, further preferably 0.6% or more. If the content of $P_2O_5$ is too large, phase separation is prone to occur during melting and the acid resistance lowers to a large extent. It is therefore preferable that the content of $P_2O_5$ be 4% or less, even preferably 2% or less.

$ZrO_2$ is a component for increasing the surface compressive stress produced by ion exchange and the present glass ceramic may contain $ZrO_2$ if necessary. It is preferable that the content of $ZrO_2$ be 0.5% or more, even preferably 1% or more. To suppress devitrification at the time of melting, it is even preferable that the content of $ZrO_2$ be 5% or less, even preferably 3% or less.

The present glass ceramic may contain $B_2O_3$ if necessary. To increase the chipping resistance and the meltability, it is preferable that the content of $B_2O_3$ be 0.1% or more, even preferably 0.2% or more. If the content of $B_2O_3$ is too large, striae or phase separation is prone to occur during melting to lower the quality of glass for chemical strengthening. It is therefore preferable that the content of $B_2O_3$ be 5% or less, even preferably 3% or less and further preferably 1% or less.

Although $TiO_2$ may increase the UV resistance, it is prone to cause coloration. The present glass ceramic may contain $TiO_2$ if necessary. However, it is preferable that the content of TiO$_2$ be 0.5% or less, even preferably 0.3% or less and further preferably 0.2% or less.

Fe$_2$O$_3$ is prone to cause coloration. The present glass ceramic may contain Fe$_2$O$_3$, but it is preferable that the content of Fe$_2$O$_3$ be 0.1% or less, even preferably 0.05% or less.

If necessary, the present glass ceramic may contain SO$_3$, a chloride, a fluoride, or the like as a refining agent at the time of glass melting. It is preferably that substantially no As$_2$O$_3$ be contained. Where Sb$_2$O$_3$ is contained, it is preferable that its content be 0.3% or less, even preferably 0.1% or less. It is most preferable that substantially no Sb$_2$O$_3$ be contained. The expression "substantially no (substance name) is contained" means that the substance concerned is not contained except for a case that it is contained as an unavoidable impurity.

The present glass ceramic is typically shaped like a sheet and may be shaped like a flat sheet or have a curved shape.

Where the present glass ceramic is shaped like a sheet, it is preferable that its thickness (t) be 3 mm or less, more preferably 2 mm or less, 1.6 mm or less, 1.1 mm or less, 0.9 mm or less, 0.8 mm or less, and 0.7 mm or less stepwisely. From the viewpoint of obtaining sufficient strength by chemically strengthening treatment, it is preferable that the thickness (t) be 0.3 mm or more, even preferably 0.4 mm or more and further preferably 0.5 mm or more. The present glass ceramic may have a portion having a different thickness.

It is preferable that the light transmittance of the present glass ceramic as converted into a value corresponding to a thickness of 0.7 mm be 85% or more in a wavelength range of 380 nm to 780 nm. This makes it easier to see the screen of a portable display when the present glass ceramic is used as its cover glass. It is more preferable that the light transmittance as converted into a value corresponding to a thickness of 0.7 mm be 88% or more, even preferably 90% or more. Whereas the degree of preference increases as the light transmittance as converted into a value corresponding to a thickness of 0.7 mm becomes higher, usually the light transmittance is 92% or less. Light transmittance of 90% as converted into a value corresponding to a thickness of 0.7 mm is equivalent to that of common amorphous glass.

Where the actual thickness of glass ceramic is not equal to 0.7 mm, light transmittance as converted into a value corresponding to a thickness of 0.7 mm can be calculated on the basis of a measured value according to the Lambert-Beer law. Where the sheet thickness t is larger than 0.7 mm, light transmittance may be measured after the sheet thickness is adjusted to 0.7 mm by polishing, etching, or the like.

It is preferable that the haze value as converted into a value corresponding to a thickness of 0.7 mm be 0.5% or less, even preferably 0.4% or less, further preferably 0.3% or less, even further preferably 0.2% or less, and particularly preferably 0.15% or less. Whereas the degree of preference increases as the haze value becomes smaller, usually the haze value is 0.01% or more. The haze value of common amorphous glass is equal to about 0.02%.

Where the actual thickness of glass ceramic is not equal to 0.7 mm, a haze value as converted into a value corresponding to a thickness of 0.7 mm can be calculated on the basis of a haze value measured for an original thickness and a haze value measured after changing the thickness by working. Where the sheet thickness t is larger than 0.7 mm, a haze value may be measured after adjusting the sheet thickness to 0.7 mm by polishing, etching, or the like.

From the viewpoint of suppressing a warp that may occur at the time of chemically strengthening treatment, it is preferable that the Young's modulus of the present glass ceramic be 80 GPa or more, even preferably 85 GPa or more, further preferably 90 GPa or more, and particularly preferably 95 GPa or more. There may occur a case that the present glass ceramic is used after being polished. To increase the ease of polishing, it is preferable that the Young's modulus be 130 GPa or less, even preferably 120 GPa or less and further preferably 110 GPa or less.

The present glass ceramic is high in Vickers hardness and hence is less prone to be scratched. It is preferable that the Vickers hardness of the present glass ceramic be 680 GPa or more, even preferably 720 GPa or more and further preferably 750 GPa or more.

The present glass ceramic is high in fracture toughness and hence is less prone to fracture violently even when large compressive stress is produced therein by chemical strengthening. A fracture toughness value can be measured by, for example, a DCDC method (Acta Metall. Mater., Vol. 43, pp. 3453-3458, 1995). It is preferable that the fracture toughness value of the present glass ceramic be 0.85 MPa·m$^{1/2}$ or more, even preferably 0.90 MPa·m$^{1/2}$ or more and further preferably 1.0 MPa·m$^{1/2}$ or more. Glass that is high in impact resistance can be obtained if the fracture toughness value is larger than or equal to the above lower limit. Although there are no particular limitations on the upper limit of the fracture toughness value of the present glass ceramic, typically the fracture toughness value is 2.0 MPa·m$^{1/2}$ or less.

<Chemically Strengthened Glass>

Chemically strengthened glass of the embodiment (hereinafter also referred to as "present chemically strengthened glass") is obtained by subjecting the present glass ceramic to ion exchange treatment.

The composition of the present chemically strengthened glass is the same as the present glass ceramic except that ion exchange of alkali metal ions has been performed in the vicinity of the surface.

Crystals included in the present chemically strengthened glass are basically the same as in the present glass ceramic. However, crystals existing in the vicinity of the surface of the present chemically strengthened glass have been influenced by the ion exchange and hence may be different in composition or crystal structure. Furthermore, the crystallization ratio may be lowered in the vicinity of the surface.

The present chemically strengthened glass is typically shaped like a sheet and may be shaped like a flat sheet or have a curved shape.

Where the present chemically strengthened glass is shaped like a sheet, it is preferable that its thickness (t) be 3 mm or less, more preferably 2 mm or less, 1.6 mm or less, 1.1 mm or less, 0.9 mm or less, 0.8 mm or less, and 0.7 mm or less stepwisely. From the viewpoint of obtaining sufficient strength by chemically strengthening treatment, it is preferable that the thickness (t) be 0.3 mm or more, even preferably 0.4 mm or more and further preferably 0.5 mm or more. The present chemically strengthened glass may have a portion having a different thickness.

What have been described above with respect to the light transmittance and the haze of the present glass ceramic also apply to those of the present chemically strengthened glass. The same is true of the UV resistance.

What have been described above with respect to the Young's modulus of the present glass ceramic also basically apply to that of the present chemically strengthened glass. There may occur a case that the Vickers hardness of the present chemically strengthened glass is made higher by the chemical strengthening by 30 to 100 GPa as compared with before chemical strengthening.

In the present chemically strengthened glass, the surface compressive stress value (CS) being 100 MPa or more is preferable because breaking by bending can be prevented. It is even preferable that CS be 150 MPa or more, further preferably 200 MPa or more.

In the present chemically strengthened glass, the depth of a compressive stress layer (DOC) being 100 µm or more is preferable because breaking by dropping can be prevented. It is even preferable that DOC be 110 µm or more, further preferably 120 µm or more.

In the present chemically strengthened glass, the central tensile stress value (CT) being 130 MPa or less is preferable because scattering of glass fragments can be prevented when the glass is broken. It is even preferable that CT be 120 MPa or less, further preferably 110 MPa or less.

<Manufacturing Methods of Glass Ceramic and Chemically Strengthened Glass>

The present glass ceramic can be manufactured by a method of crystallizing amorphous glass by subjecting it to heat treatment. The present chemically strengthened glass can be manufactured by a method of performing chemically strengthening treatment, which will be described later, on the present glass ceramic.

(Manufacture of Amorphous Glass)

For example, amorphous glass for the present invention can be manufactured by the following method. The following manufacturing method is directed to an example case of manufacturing sheet-shaped glass.

Glass materials are mixed together so that glass having a desired composition can be produced and then heat-melted in a glass melting furnace. Resulting molten glass is homogenized by bubbling, stirring, addition of a refining agent, etc., formed into a glass sheet having a prescribed thickness by a known forming method, and then cooled gradually. Alternatively, molten glass is formed into a block shape, cooled gradually, and then shaped into a sheet shape by cutting.

(Crystallization Treatment)

Glass ceramic can be obtained by performing heat treatment on the amorphous glass obtained according to the above procedure.

The heat treatment may be two-step heat treatment of increasing the temperature from room temperature to a first treatment temperature and maintaining the first treatment temperature for a prescribed time and then keeping the temperature at a second treatment temperature that is higher than the first treatment temperature for a prescribed time. Alternatively, a three-step heat treatment may be performed in which the temperature is kept at a third treatment temperature for a prescribed time after execution of the two-step heat treatment. As a further alternative, a one-step heat treatment may be performed in which the temperature is kept at a particular treatment temperature and then decreased to room temperature gradually.

In the case of the two-step heat treatment, it is preferable that the first treatment temperature be in such a temperature range that the crystal nuclei generation rate is high with the glass composition concerned and the second treatment temperature be in such a temperature range that the crystal growth rate is high with the glass composition concerned. In the case of the three-step heat treatment, it is preferable that the first treatment temperature and the second treatment temperature be set at such temperatures that the crystal nuclei generation rate is high and the third treatment temperature be set at such a temperature that the crystal growth rate is high. Alternatively, the first treatment temperature is set at such a temperature that the crystal nuclei generation rate is high and the second treatment temperature and the third treatment temperature are set at such temperatures that the crystal growth rate is high.

It is preferable that the holding time at the first treatment temperature be so long that a sufficient number of crystal nuclei are generated. Where a large number of crystal nuclei are generated, individual crystals are made small in size, whereby highly transparent glass ceramic can be obtained.

In the case of the two-step treatment, for example, the first treatment temperature that is 500° C. to 700° C. is maintained for 1 to 6 hours and then the second treatment temperature that is 600° C. to 800° C. is maintained for 1 to 6 hours.

In the case of the three-step treatment, for example, the first treatment temperature that is 500° C. to 600° C. is maintained for 1 to 6 hours, the second treatment temperature that is 550° C. to 650° C. is maintained for 1 to 6 hours, and then the third treatment temperature that is 600° C. to 800° C. is maintained for 1 to 6 hours. In the case of the one-step treatment, for example, a temperature that is 500° C. to 800° C. is maintained for 1 to 6 hours.

A glass ceramic sheet is formed by, if necessary, grinding and polishing glass ceramic obtained according to the above procedure. Where a glass ceramic sheet is to be cut into a prescribed shape and size and subjected to chamfering, performing cutting and chamfering before it is subjected to chemically strengthening treatment is preferable because compressive stress layers are formed adjacent to the end surfaces by the chemically strengthening treatment performed thereafter.

(Chemically Strengthening Treatment)

The chemically strengthening treatment is treatment for replacing metal ions having a small ion radius (typically, Na ions or Li ions) in the glass with metal ions having a large ion radius (typically, Na ions or K ions for Li ions and K ions for Na ions) by bringing the glass into contact with metal salt by immersing the glass in a melt of the metal salt (e.g., potassium nitrate) containing metal ions having large ion radius (typically, Na ions or K ions).

To increase the rate of the chemically strengthening treatment, it is preferable to employ "Li—Na exchange" of replacing Li ions in the glass with Na ions. To produce large compressive stress by the ion exchange, it is preferable to employ "Na—K exchange" of replacing Na ions in the glass with K ions.

Examples of molten salt to be used for the chemically strengthening treatment are nitrate salt, sulfate salt, carbonate salt, and chloride salt. Among them, examples of nitrate salt are lithium nitrate, sodium nitrate, potassium nitrate, cesium nitrate, and silver nitrate. Examples of sulfate salt are lithium sulfate, sodium sulfate, potassium sulfate, cesium sulfate, and silver sulfate. Examples of carbonate salt are lithium carbonate, sodium carbonate, and potassium carbonate. Examples of chloride salt are lithium chloride, sodium chloride, potassium chloride, cesium chloride, and silver chloride. These kinds of molten salt may be used either singly or in the form of a combination of plural kinds.

As for the treatment conditions of the chemically strengthening treatment, a time, a temperature, etc. can be selected taking a glass composition, a kind of molten salt, etc. into consideration. For example, the present glass ceramic can be subjected to chemically strengthening treatment that is performed preferably at 500° C. or less and preferably for 20 hours or shorter.

Chemically strengthened glass obtained by chemically strengthening the present glass ceramic is particularly useful when used as a cover glass used in an electronic device such as a mobile device such as a cellphone or a smartphone. The chemically strengthened glass is also useful when used as a cover glass of an electronic device not intended to mobile use such as a TV receiver, a personal computer, or a touch panel or wall surfaces of an elevator or wall surfaces of a construction such as a house or a building (whole-surface display). Still further, the chemically strengthened glass is useful when used as a construction material such as a window glass, a table top, or an interior component, for example, of an automobile, an airplane, or the like as well as a cover glass of each of them. In addition, the chemically strengthened glass is useful when used as, for example, a body having a curved shape.

EXAMPLES

Although the present invention will be described below using Examples, the invention is not limited by them. Glass ceramic B is an Inventive Example and glass ceramic A and glass ceramic C are Comparative Examples.

<Preparation of Amorphous Glass and Glass Ceramic>

(Preparation of Amorphous Glass)

Glass materials were mixed together so that each glass composition shown in Table 1 in mol % in terms of oxides was obtained and then weighed so that glass of 400 g was obtained. Then the mixed glass materials were put into a platinum crucible, melted in an electric furnace of 1,600° C. for about 3 hours, defoamed, and homogenized.

Glass thus obtained was caused to flow into a die. Each of glass A and glass B was kept at 475° C. for 1 hour and cooled to room temperature at a rate of 0.5° C./min, whereby a glass block was obtained (amorphous glass A and amorphous glass B). As for glass C, glass block was obtained in the same manner as glass A and glass B except that glass C was kept at 540° C. for 1 hour (amorphous glass C).

(Crystallization Treatment)

Each of the thus-obtained blocks of amorphous glass A and amorphous glass B was worked into 50 mm×50 mm×1.5 mm, kept at 540° C. for 4 hours, kept at 600° C. for 4 hours, further kept at 710° C. for 4 hours, and cooled to room temperature, whereby each of glass ceramic A and glass ceramic B was obtained. The block of amorphous glass C was worked into 50 mm×50 mm×1.5 mm, kept at 550° C. for 2 hours, kept at 750° C. for 2 hours, and cooled to room temperature, whereby glass ceramic C was obtained. In the crystallization treatment for each kind of amorphous glass, the temperature raising rate to each temperature was set at 5° C./min and the temperature lowering rate was set at −5° C./min.

TABLE 1

|  | Glass A | Glass B | Glass C |
| --- | --- | --- | --- |
| SiO$_2$ | 70.1 | 69.9 | 60.8 |
| Al$_2$O$_3$ | 4.3 | 4.3 | 5.0 |
| B$_2$O$_3$ | 0.2 | 0.2 | 0.0 |
| P$_2$O$_5$ | 0.8 | 0.8 | 2.0 |
| MgO | 0.0 | 0.0 | 5.0 |
| Li$_2$O | 21.4 | 21.4 | 21.0 |
| Na$_2$O | 1.5 | 1.5 | 2.0 |
| ZrO$_2$ | 1.7 | 1.7 | 3.0 |
| Y$_2$O$_3$ | 0.0 | 0.0 | 1.0 |
| HfO$_2$ | 0.0 | 0.2 | 0.2 |

<Evaluations>

(Transmittance and UV Resistance)

Transmittance was measured using a spectrophotometer (product name: U-4100) produced by Hitachi High-Tech Corporation.

Figure 3:
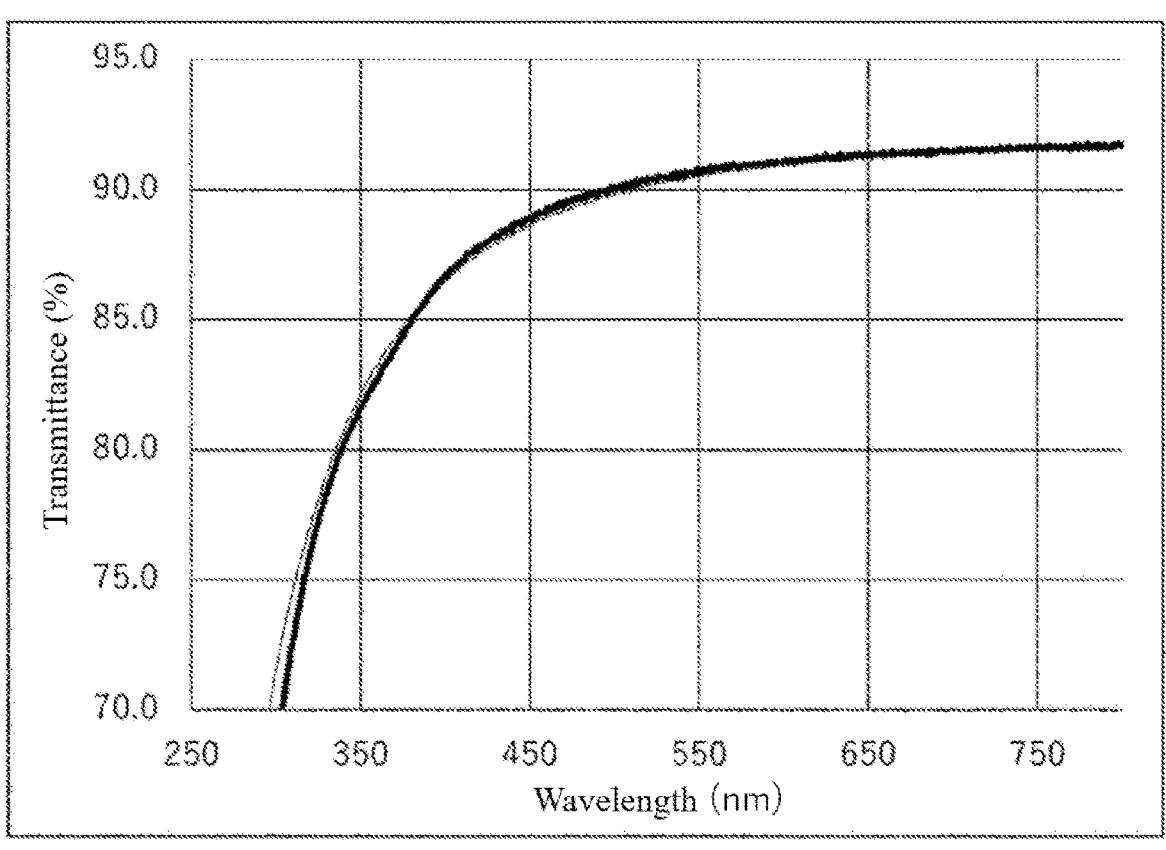
FIG. 3 shows transmittance spectra of glass ceramic A and glass ceramic B before irradiation with ultraviolet light.
Figure 4:
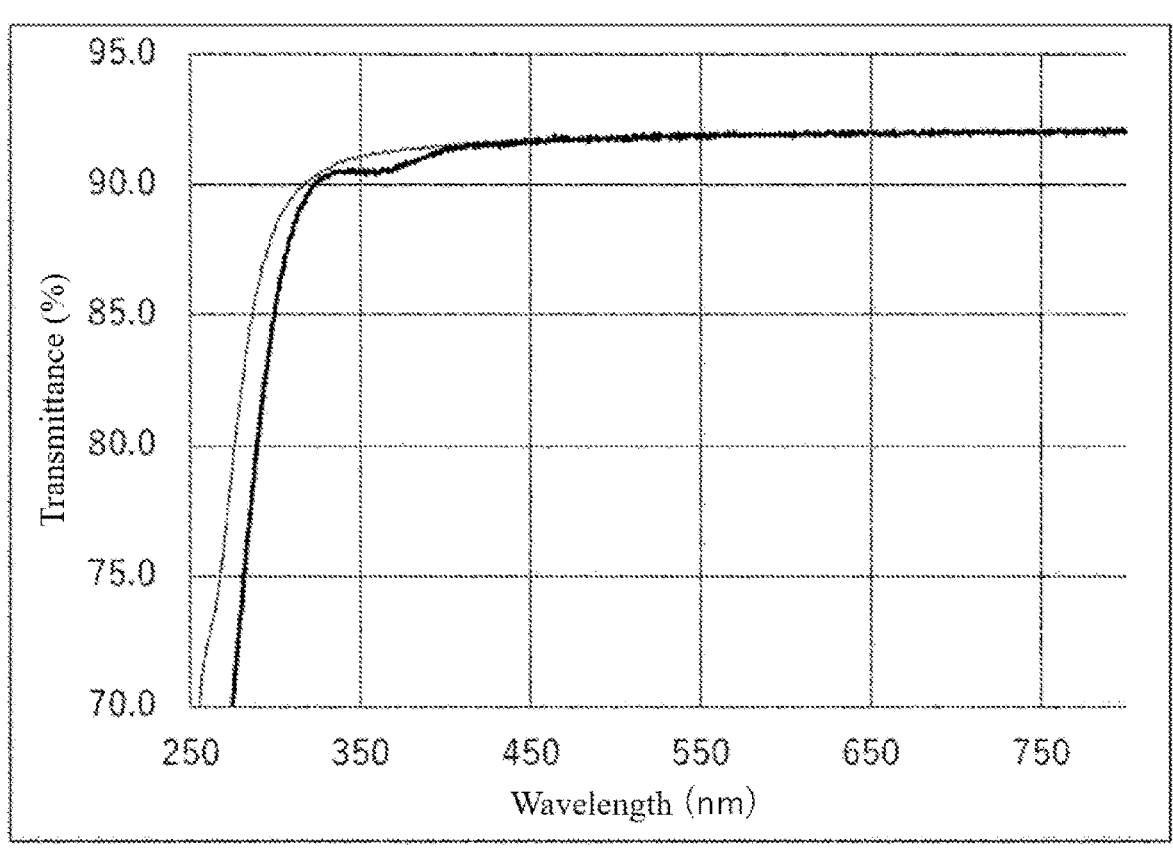
FIG. 4 shows transmittance spectra of amorphous glass A and amorphous glass B before irradiation with ultraviolet light.
Figure 8:
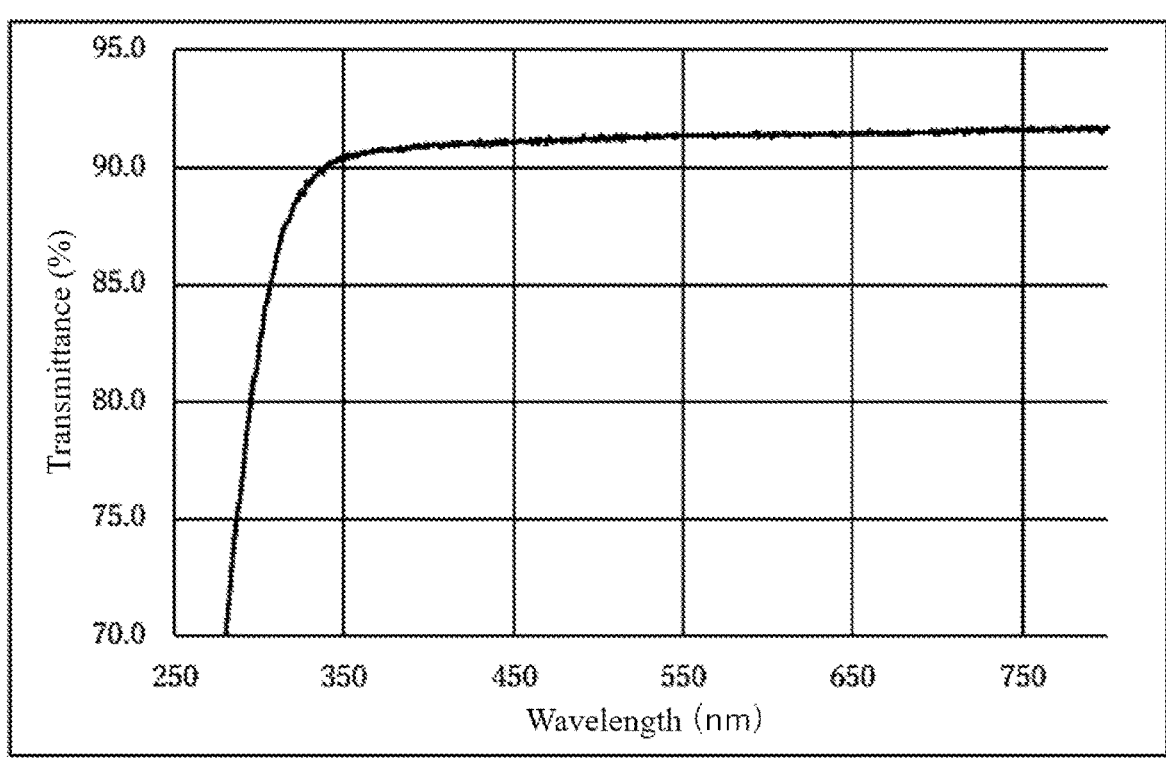
FIG. 8 shows a transmittance spectrum of glass ceramic C before irradiation with ultraviolet light.

FIG. 3 shows results of transmittance measurements performed on glass ceramic A and glass ceramic B before irradiation with ultraviolet light. In FIG. 3, a spectrum of glass ceramic A is represented by a thin-line curve and a spectrum of glass ceramic B is represented by a thick-line curve. FIG. 4 shows transmittance spectra of amorphous glass A (thin-line curve) and amorphous glass B (thick-line curve) before irradiation with ultraviolet light. FIG. 8 shows a transmittance spectrum of glass ceramic C before irradiation with ultraviolet light.

Subsequently, each of amorphous glass A to amorphous glass C and each of glass ceramic A to glass ceramic C were irradiated with ultraviolet light.

The irradiation with ultraviolet light was performed by a method of placing an irradiation target glass sheet still on a stage horizontally and irradiating it with light emitted from a low-pressure mercury lamp (a desktop surface treatment device (type name: SSP16-110; main wavelengths: 185 nm and 254 nm) produced by Sen Lights Corporation) for 10 minutes from a position that is located over the glass sheet with a distance of 5 cm. Transmittance of each irradiated glass sheet was measured. The illuminance at the place where each glass sheet was set was 19 mW/cm$^2$ (measured by an illuminometer "UV-M08-25" produced by Orc Manufacturing Co., Ltd.)

Figure 5:
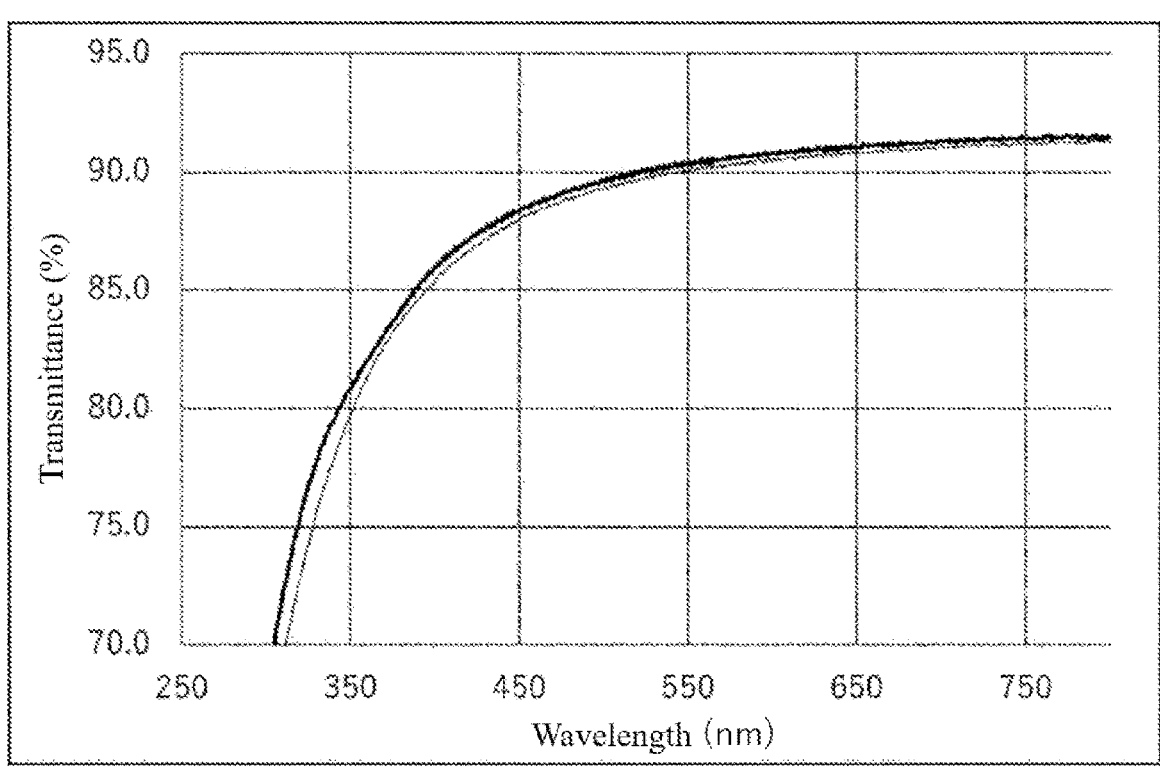
FIG. 5 shows transmittance spectra of glass ceramic A and glass ceramic B after the irradiation with ultraviolet light.
Figure 6:
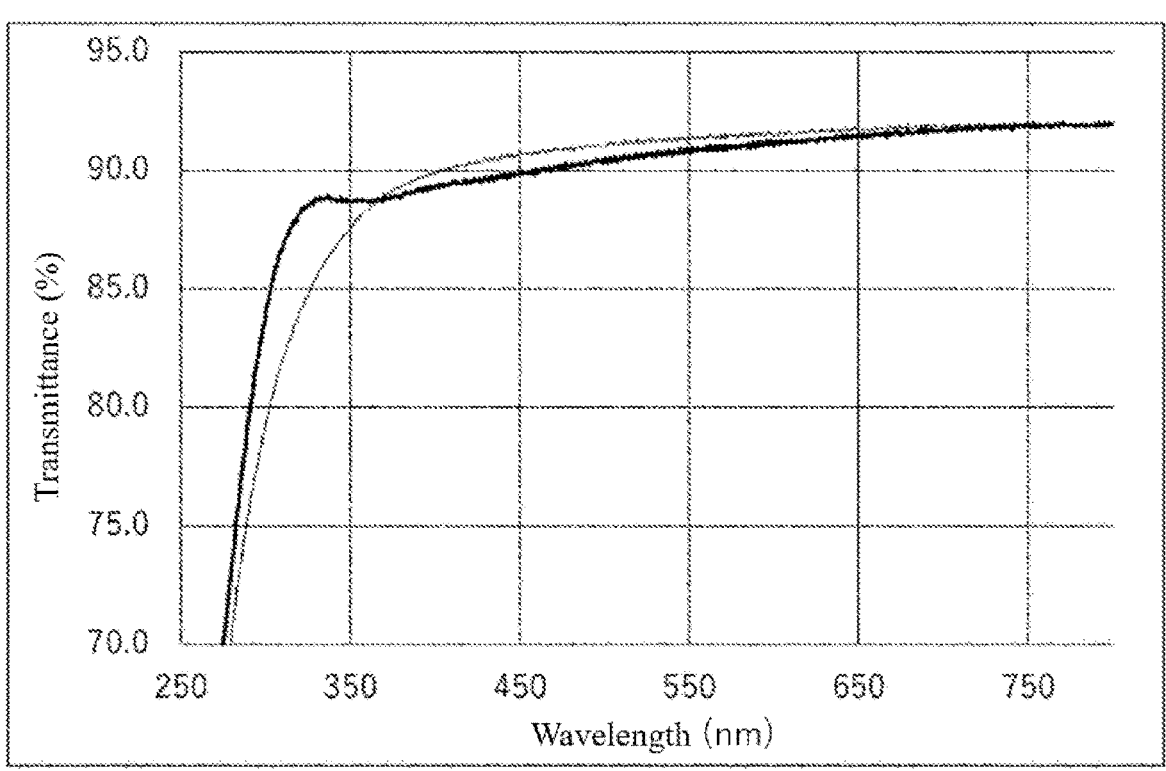
FIG. 6 shows transmittance spectra of amorphous glass A and amorphous glass B after the irradiation with ultraviolet light.
Figure 9:
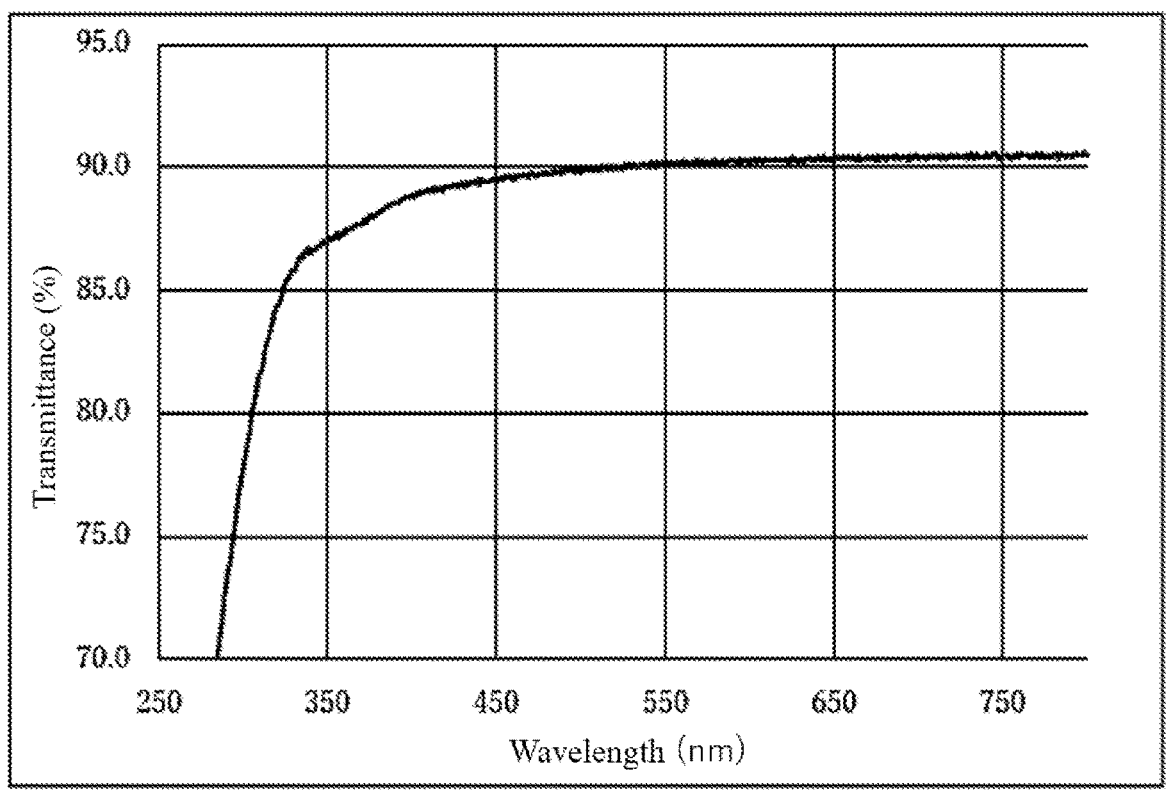
FIG. 9 shows a transmittance spectrum of glass ceramic C after the irradiation with ultraviolet light.

FIG. 5 shows transmittance spectra of glass ceramic A and glass ceramic B after the irradiation with ultraviolet light. A thin-line curve represents a result of glass ceramic A and a thick-line curve represents a result of glass ceramic B in FIG. 5. FIG. 6 shows transmittance spectra of amorphous glass A (thin-line curve) and amorphous glass B (thick-line curve) after the irradiation with ultraviolet light. FIG. 9 is a transmittance spectrum of glass ceramic C after the irradiation with ultraviolet light.

Ultraviolet-induced absorption $\Delta\alpha$ that is given by the following equation was calculated, where T0 and T1 are transmittance values at each wavelength before and after irradiation with ultraviolet light, respectively:

$$\Delta\alpha = -\ln(T1/T0).$$

Figure 7:
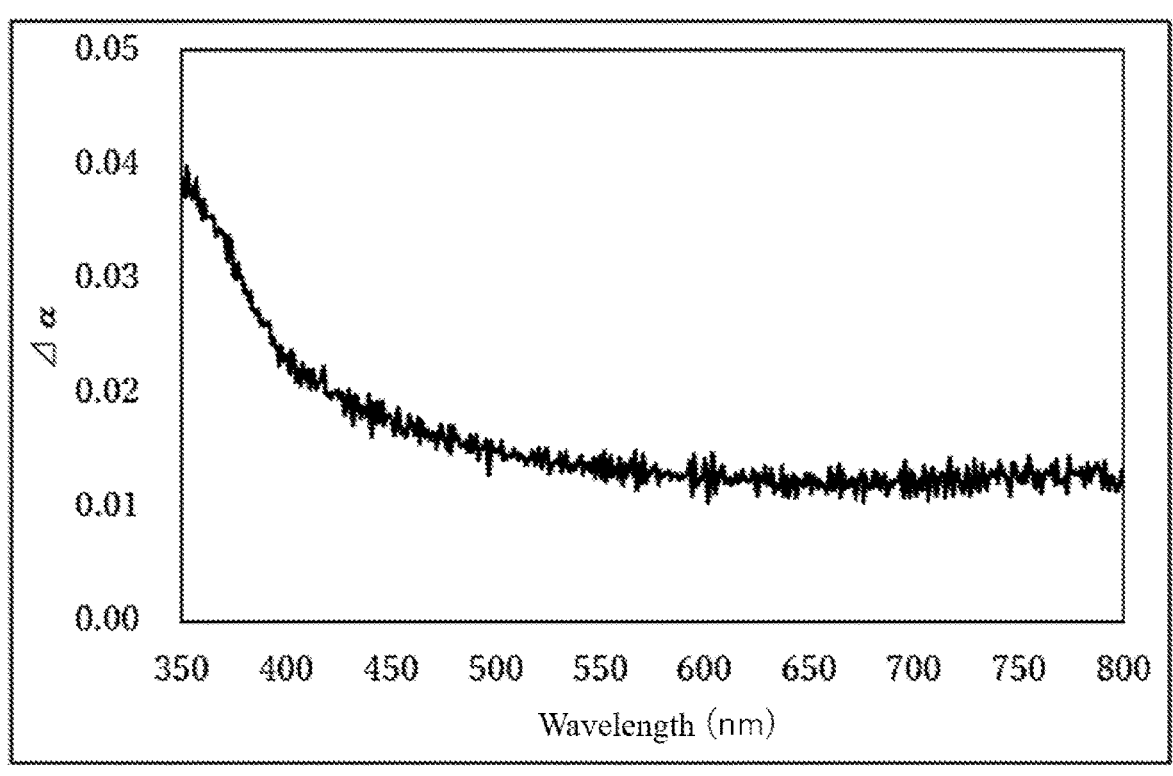
FIG. 7 shows an ultraviolet-induced absorption spectrum of glass ceramic C.

Results are shown in FIGS. 1, 2, and 7. FIG. 1 shows ultraviolet-induced absorption $\Delta\alpha$ of glass ceramic A (thin-line curve) and glass ceramic B (thick-line curve). FIG. 2 shows ultraviolet-induced absorption $\Delta\alpha$ of amorphous glass A (thin-line curve) and amorphous glass B (thick-line curve). FIG. 7 shows an ultraviolet-induced absorption $\Delta\alpha$ of glass ceramic C.

As for ultraviolet-induced absorption values $\Delta\alpha$ at a wavelength of 380 nm, glass ceramic A was 0.017, glass ceramic B was 0.008, amorphous glass A was 0.022, amorphous glass B was 0.021, and glass ceramic C was 0.029.

(Haze, Young's Modulus, Vickers Hardness, and Fracture Toughness Value)

A glass ceramic sheet having a thickness t of 0.7 mm was prepared for glass ceramic B which is an Inventive Example and its major surfaces were mirror-polished. Values of the following physical properties of the glass ceramic sheet obtained were evaluated.

A haze value with a halogen lamp C light source, which was measured using a haze meter ("HZ-V3" produced by Suga Test Instruments Co., Ltd.), was 0.11%.

A Young's modulus, which was measured by an ultrasonic method, was 105 GPa.

Also, a Vickers hardness was measured. The Vickers hardness was 800 GPa.

A fracture toughness value, which was measured by a DCDC method, was 1.17 MPa·m$^{1/2}$.

(Precipitated Crystals)

Part of each of glass ceramic A, glass ceramic B, and glass ceramic C was ground using an agate mortar and precipitated crystals were identified by performing a powder X-ray diffraction measurement under the following conditions:

Measuring instrument: "Smart Lab" produced by Rigaku Corporation

X-ray used: CuK α ray

Measurement range: 2θ=10° to 80°

Speed: 1°/min; and

Step: 0.01°.

Crystals detected were petalite and lithium disilicate in the cases of glass ceramic A and glass ceramic B and were lithium phosphate in the case of glass ceramic C.

(Chemical Strengthening Properties)

Two samples of Glass ceramic B-1 and glass ceramic B-2 which were made of glass ceramic B were each subjected to chemically strengthening treatment and evaluation of chemical strengthening properties under the following conditions.

Glass ceramic B-1 having a thickness of 0.7 mm was subjected to chemically strengthening treatment at 470° C. for 6 hours using molten salt containing 100 wt % sodium nitrate, whereby chemically strengthened glass B-1 was obtained. A stress profile of chemically strengthened glass B-1 was measured using a scattered light photoelastic stress meter (model: SLP-2000) produced by Orihara Manufacturing Co., Ltd. A surface compressive stress value (CS) was 207 MPa, a depth of a compressive stress layer (DOC) was 127 μm and a central tensile stress value (CT) was 61 MPa.

Glass ceramic B-2 having a thickness of 0.7 mm was subjected to chemically strengthening treatment at 470° C. for 15 hours using molten salt containing 40 wt % sodium nitrate and 60 wt % potassium nitrate, whereby chemically strengthened glass B-2 was obtained. A stress profile of chemically strengthened glass B-2 was measured in the same manner as that of chemically strengthened glass B-1. A surface compressive stress value (CS) was 232 MPa, a depth of a compressive stress layer (DOC) was 114 μm and a central tensile stress value (CT) was 57 MPa.

Glass ceramic B, which is an Inventive Example of the present invention, was high in transparency, small in haze value, superior in mechanical properties, e.g., large in Young's modulus and fracture toughness value, and high in UV resistance.

On the other hand, glass ceramic A which did not contain HfO$_2$ was inferior in UV resistance. Furthermore, glass ceramic C in which LAS crystals did not precipitate and lithium phosphate crystals precipitated was inferior in UV resistance.

Although the present invention has been described in detail by referring to the particular embodiment, it is apparent to those skilled in the art that various changes and modifications are possible without departing from the spirit and scope of the invention.

The invention claimed is:

1. A glass ceramic comprising crystals, and comprising, in mol % in terms of oxides:

65-69.9% of SiO$_2$;

4-6% of Al$_2$O$_3$;

15-23% of Li$_2$O;

1-6% of Na$_2$O;

0.2-4% of P$_2$O$_5$;

0.1-3% B$_2$O$_3$;

0.5-3% of ZrO$_2$; and 0.015-0.3% of HfO$_2$, wherein the crystals comprise one or more kinds of crystals selected from the group consisting of β-spodumene crystals, petalite crystals, and eucryptite crystals.

2. The glass ceramic according to claim 1, comprising, in mol % in terms of oxides, 15-21.4% of Li$_2$O.

3. The glass ceramic according to claim 1, having a light transmittance as converted into a value corresponding to a thickness of 0.7 mm of 85% or more in a wavelength range of 380 nm to 780 nm.

4. The glass ceramic according to claim 1, having a Young's modulus of 85 GPa or more.

5. A chemically strengthened glass comprising crystals, and comprising, in mol % in terms of oxides:

65-69.9% of SiO$_2$;

4-6% of Al$_2$O$_3$;

15-23% of Li$_2$O;

1-6% of Na$_2$O;

0.2-4% of P$_2$O$_5$;

0.1-3% B$_2$O$_3$;

0.5-3% of ZrO$_2$; and 0.015-0.3% of HfO$_2$, wherein the crystals comprise one or more kinds of crystals selected from the group consisting of β-spodumene crystals, petalite crystals, and eucryptite crystals.

6. The chemically strengthened glass according to claim 5, comprising, in mol % in terms of oxides, 15-21.4% of Li$_2$O.

7. The chemically strengthened glass according to claim 5, having a light transmittance as converted into a value corresponding to a thickness of 0.7 mm of 85% or more in a wavelength range of 380 nm to 780 nm.

8. The chemically strengthened glass according to claim 5, having a surface compressive stress value of 100 MPa or more, a depth of a compressive stress layer of 100 μm or more, and a central tensile stress value of 130 MPa or less.

9. A glass ceramic comprising crystals, and comprising, in mol % in terms of oxides:

65-69.9% of SiO$_2$;

3-6% of Al$_2$O$_3$;

15-23% of Li$_2$O;

0-6% of Na$_2$O;

0.2-4% of P$_2$O$_5$;

0-3% B$_2$O$_3$;

0.5-5% of ZrO$_2$; and 0.015-0.5% of HfO$_2$, wherein the crystals comprise one or more kinds of crystals selected from the group consisting of β-spodumene crystals, petalite crystals, and eucryptite crystals.

10. The glass ceramic according to claim 9, having a light transmittance as converted into a value corresponding to a thickness of 0.7 mm of 85% or more in a wavelength range of 380 nm to 780 nm.

11. The glass ceramic according to claim 9, having a Young's modulus of 85 GPa or more.

12. A chemically strengthened glass comprising crystals, and comprising, in mol % in terms of oxides:

65-69.9% of SiO$_2$;

3-6% of Al$_2$O$_3$;

15-23% of Li$_2$O;

0-6% of $Na_2O$;

0.2-4% of $P_2O_5$;

0-3% $B_2O_3$;

0.5-5% of $ZrO_2$; and 0.015-0.5% of $HfO_2$, wherein the crystals comprise one or more kinds of crystals selected from the group consisting of β-spodumene crystals, petalite crystals, and eucryptite crystals.

13. The chemically strengthened glass according to claim 12, having a surface compressive stress value of 100 MPa or more, a depth of a compressive stress layer of 100 μm or more, and a central tensile stress value of 130 MPa or less.

\* \* \* \* \*